US010316948B2

(12) United States Patent
Valente

(10) Patent No.: US 10,316,948 B2
(45) Date of Patent: Jun. 11, 2019

(54) LIMITED SLIP AND/OR LOCKING SPLIT SHAFT DISCONNECT AXLE

(71) Applicant: American Axle & Manufacturing, Inc., Detroit, MI (US)

(72) Inventor: Paul J. Valente, Berkley, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 166 days.

(21) Appl. No.: 15/283,531

(22) Filed: Oct. 3, 2016

(65) Prior Publication Data

US 2018/0094714 A1 Apr. 5, 2018

(51) Int. Cl.

| | |
|---|---|
| ***F16H 48/22*** | (2006.01) |
| ***B60K 17/04*** | (2006.01) |
| ***F16H 48/24*** | (2006.01) |
| ***B60K 17/16*** | (2006.01) |
| ***F16H 48/10*** | (2012.01) |
| *B60K 17/344* | (2006.01) |
| *F16H 48/38* | (2012.01) |

(52) U.S. Cl.

CPC ........... *F16H 48/24* (2013.01); *B60K 17/046* (2013.01); *B60K 17/20* (2013.01); *F16H 48/10* (2013.01); *F16H 48/22* (2013.01); *B60K 17/344* (2013.01); *F16H 2048/385* (2013.01)

(58) Field of Classification Search

CPC .............................. F16H 48/22; B60K 17/046

See application file for complete search history.

(56) References Cited

U.S. PATENT DOCUMENTS 4,215,593 A * 8/1980 Shono ................ B60K 17/3462 475/204
4,779,699 A * 10/1988 Hatano .............. B60K 17/3462 180/248
5,042,610 A * 8/1991 Shiraishi ............. B60K 17/346 180/249
5,547,430 A * 8/1996 Gasch ................ B60K 17/3465 475/221
5,700,222 A * 12/1997 Bowen .............. B60K 17/3467 180/248
6,790,154 B1 9/2004 Kelley, Jr.
7,086,982 B2 * 8/2006 Bowen .............. B60K 23/0808 475/225
7,713,159 B2 * 5/2010 Hirota .................... B60K 17/20 475/249

(Continued)

*Primary Examiner* — Tisha D Lewis

(74) *Attorney, Agent, or Firm* — Harness, Dickey & Pierce, P.L.C.

(57) ABSTRACT

An all-wheel drive vehicle drivetrain can include an input member, first and second output members, a planetary differential, a first clutch, and a second clutch. The differential can include an internal gear, a carrier, a sun gear, and a differential gear set. The internal gear can be coupled to the input member to receive input torque about an axis. The carrier can be coupled to the first output for common rotation about the axis. The differential gear set can receive input torque from the internal gear and output differential torque to the carrier and the sun gear. The first clutch can be operable to selectively couple and decouple the sun gear with the second output member for common rotation. The second clutch can be operable to selectively transmit torque between the carrier and the second output member.

19 Claims, 4 Drawing Sheets

(56) References Cited

U.S. PATENT DOCUMENTS

| | | | | |
|---|---|---|---|---|
| 8,042,642 | B2 | 10/2011 | Marsh et al. | |
| 8,469,854 | B1 | 6/2013 | Downs et al. | |
| 8,584,786 | B2 | 11/2013 | Grogg | |
| 2006/0289228 | A1* | 12/2006 | Sharma | B60K 17/3462 180/433 |

* cited by examiner

CONTROLLER
138'
150'
114'
146'
322
334
318
310
326
330
314
270'
274'
272'
264'
268'
218'
210'
214'
266'
262'
126'
290'
118'
258'
250'
122'
226'
238'
230'
242'
234'
254'
246'
130'
110'
140'
142'
222'

LIMITED SLIP AND/OR LOCKING SPLIT SHAFT DISCONNECT AXLE

FIELD

The present disclosure relates to a limited slip and/or locking split shaft disconnect axle.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and/or on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. To this end, there remains a need in the art for development of improved disconnectable drivelines for use in AWD vehicles.

SUMMARY

This section provides a general summary of the disclosure, and is not a comprehensive disclosure of its full scope or all of its features.

The present teachings provide for an all-wheel drive vehicle drivetrain which can include an input member, a first output member, a second output member, a planetary differential, a first clutch, and a second clutch. The planetary differential can include an internal gear, a planet carrier, a sun gear, and a differential gear set. The internal gear can be disposed about a central axis and drivingly coupled to the input member to receive input torque from the input member. The planet carrier can be coupled to the first output for common rotation about the central axis. The planet carrier can be rotatable relative to the internal gear. The sun gear can be rotatable about the central axis relative to the internal gear and the planet carrier. The differential gear set can be supported by the planet carrier and configured to receive input torque from the internal gear and to output differential torque to the planet carrier and the sun gear. The first clutch can be operable in a first mode wherein the sun gear is rotatable relative to the second output member, and a second mode wherein the first clutch couples the sun gear to the second output member for common rotation about the central axis. The second clutch can be operable in a third mode wherein the second clutch does not transmit torque between the planet carrier and the second output member, and a fourth mode wherein the second clutch transmits torque between the planet carrier and the second output member.

The present teachings further provide for an all-wheel drive vehicle drivetrain which can include a housing, an input member, a first output member, a second output member, a planetary differential, a first clutch, and a second clutch. The input member can be supported within the housing for rotation about a first axis. The first output member and the second output member can be supported within the housing for rotation about a second axis that can be transverse to the first axis. The planetary differential can be disposed within the housing and can include an internal gear, a planet carrier, a sun gear, and a differential gear set. The internal gear can be rotatable about the second axis and drivingly coupled to the input member to receive input torque from the input member. The planet carrier can be coupled to the first output for common rotation about the second axis. The planet carrier can be rotatable relative to the internal gear. The sun gear can be rotatable about the second axis relative to the internal gear and the planet carrier. The differential gear set can be supported by the planet carrier and can be configured to receive input torque from the internal gear and to output differential torque to the planet carrier and the sun gear. The first clutch can be operable to selectively couple and decouple the sun gear for common rotation with the second output member. The second clutch can be operable to selectively couple and decouple the planet carrier with the second output member.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
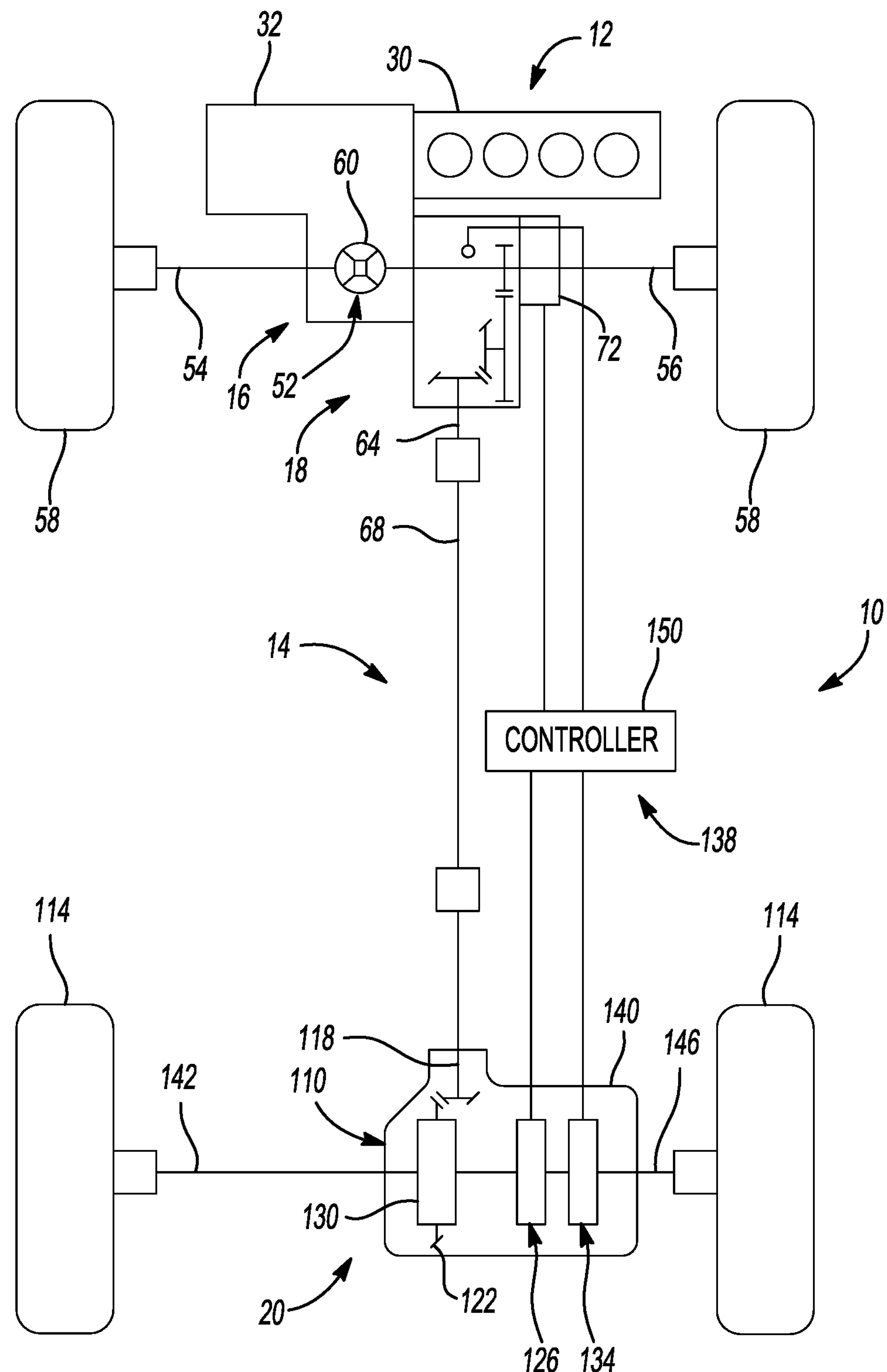
FIG. 1 is a schematic illustration of a motor vehicle equipped with a disconnectable all-wheel drive system constructed in accordance with the present teachings.

With reference to FIG. 1 of the drawings, an exemplary vehicle 10 is illustrated to include a powertrain 12 and a drivetrain 14 that can include a primary driveline 16, a power take-off unit (PTU) 18, and a secondary driveline 20. The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which outputs rotary power to the primary driveline 16 and the PTU 18. The PTU 18 can be constructed in any suitable manner to be selectively operated to transmit rotary power to the secondary driveline 20. For example, the PTU 18 can be constructed as described in commonly-assigned U.S. Pat. No. 8,961,353, the disclosure of which is incorporated by reference as if fully set forth in detail herein.

In general, the primary driveline 16 can include a first differential 52 and a pair of axle half-shafts (first half-shaft 54 and second half-shaft 56) that can couple an output of the first differential 52 to a first set of vehicle wheels 58. The first differential 52 can be conventional in its construction and operation and as such, need not be discussed in significant detail herein. Briefly, the first differential 52 can include a first differential case 60, which can be driven by the transmission 32, and a means for transmitting rotary power between the first differential case 60 and the first and second half-shafts 54, 56. In the example provided, the rotary power transmitting means is an open differential gearset that permits speed and torque differentiation between the first and second half-shafts 54, 56.

In general, the PTU 18 includes a PTU output member 64 that is coupled to a propshaft 68 for common rotation about a longitudinal axis of the vehicle 10. The PTU 18 can also include a disconnect mechanism 72 to selectively control power transmission through the PTU 18 to thereby selectively drive the propshaft 68.

In the particular example provided, the secondary driveline 20 includes the propshaft 68 and a rear axle assembly 110 that is configured to receive rotary power from the propshaft 68 and to responsively drive a second set of vehicle wheels 114. In general, the rear axle assembly 110 can include an input pinion 118, an input gear 122, a first torque transfer device 126, a second differential 130, a second torque transfer device 134, and a control system 138. The input pinion 118 can be coupled to the propshaft 68 for common rotation about the longitudinal axis of the vehicle 10. The input gear 122, the first torque transfer device 126, the second differential 130, the second torque transfer device 134, and a portion of the input pinion 118 can be disposed within a housing 140 of the rear axle assembly 110. The input gear 122 can be meshingly engaged with the input pinion 118 within the housing 140 to receive rotary power from the input pinion 118.

The second differential 130 can be a planetary differential and is described in greater detail below. In brief, the second differential 130 can be configured to receive input rotary power from the input gear 122 and output speed and torque differentiation to permit speed and torque differentiation between a third half-shaft 142 and a fourth half-shaft 146. The third and fourth half-shafts 142, 146 can be drivingly coupled to a respective one of the vehicle wheels 114. The control system 138 can include a control module 150 that can be in communication with the first and second torque transfer devices 126 and 134 and can be configured to control the activation and deactivation of the first and second torque transfer devices 126 and 134, as described below. The control module 150 can also be in communication with the disconnect mechanism 72 of the PTU 18 to control the disconnect mechanism 72 to selectively provide power to the propshaft 68.

Figure 2:
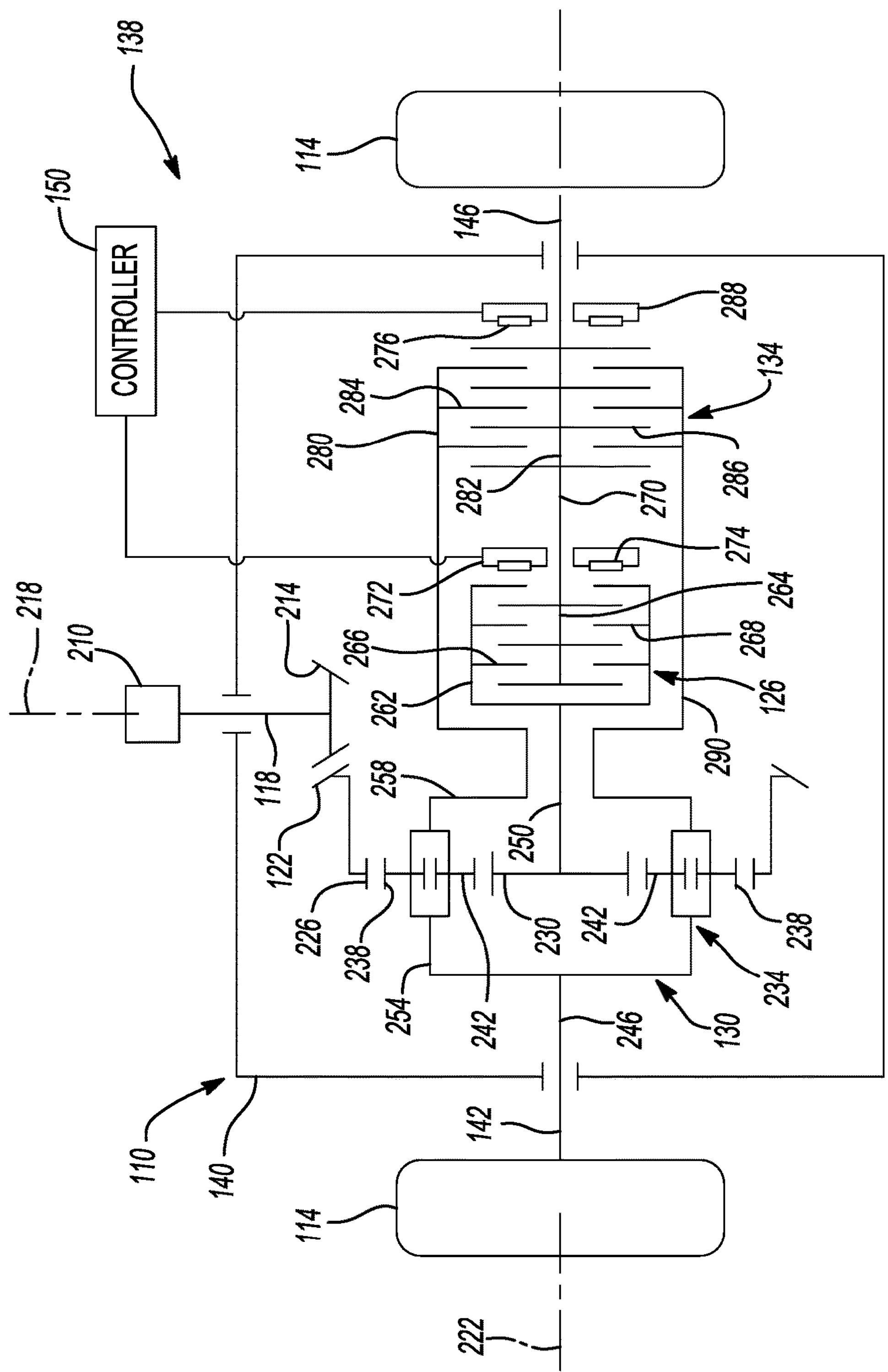
FIG. 2 is a schematic illustration of a rear drive module associated with the disconnectable all-wheel drive system of FIG. 1.

With additional reference to FIG. 2, the rear axle assembly 110 is illustrated in greater detail. One end of the input pinion 118 can include a flange 210, while the other end of the input pinion 118 can include a pinion gear 214. The flange 210 can couple the input pinion 118 to the propshaft 68 (FIG. 1). The input pinion 118 can extend through a side of the housing 140 such that flange 210 can be externally of the housing 140, while the pinion gear 214 can be within the housing 140. The input pinion 118 can be supported for rotation relative to the housing 140 along a first axis 218. In the example provided, the input pinion 118 and the input gear 122 are a hypoid gear set, wherein the input gear 122 is a hypoid ring or crown gear and the pinion gear 214 is a mating hypoid pinion gear, though other suitable meshing gear types can be used. The input gear 122 can be supported within the housing 140 for rotation relative to the housing 140 about a second axis 222 that can be transverse to or perpendicular to the first axis 218. The input gear 122 can be meshingly engaged with the pinion gear 214 within the housing 140.

The second differential 130 can include an internal gear 226 (i.e., a ring gear), a sun gear 230, a planet carrier 234, a set of first planet gears 238, a set of second planet gears 242, a first output member 246 and a second output member 250. The internal gear 226 can be supported within the housing 140 for rotation relative to the housing 140 about the second axis 222. The internal gear 226 can be fixedly coupled to the input gear 122 for common rotation. The internal gear 226 can have a plurality of internal gear teeth.

The sun gear 230 can be supported within the housing 140 for rotation relative to the internal gear 226 about the second axis 222. The sun gear 230 can be disposed radially within the internal gear 226. The sun gear 230 can be fixedly coupled to the second output member 250 for common rotation about the second axis 222. The sun gear 230 can have a plurality of external gear teeth.

The planet carrier 234 can be supported within the housing 140 for rotation relative to the internal gear 226 and the sun gear 230 about the second axis 222. A first axial side 254 of the planet carrier 234 can be fixedly coupled to the first output member 246 for common rotation about the second axis 222. The first output member 246 can be drivingly coupled to the third half-shaft 142. In the example provided, the first output member 246 is fixedly coupled to the third half-shaft 142 for common rotation therewith about the second axis 222. The planet carrier 234 can be disposed about the sun gear 230 and a second axial side 258 of the planet carrier 234 that is opposite the first axial side 254 can be disposed about the second output member 250.

The set of first planet gears 238 can include a plurality of the first planet gears 238. The first planet gears 238 can be supported by the planet carrier 234 for rotation with the planet carrier 234 about the second axis 222, but each of the first planet gears 238 can be coupled to the planet carrier 234 for rotation relative to the planet carrier 234 about a rotational axis of the respective first planet gear 238. Each of the first planet gears 238 can be disposed radially between the internal gear 226 and the sun gear 230 and can be meshingly engaged with the internal gear 226. In the example provided, the first planet gears 238 can be equally spaced circumferentially about the second axis 222.

The set of second planet gears 242 can include a plurality of the second planet gears 242. The second planet gears 242 can be supported by the planet carrier 234 for rotation with the planet carrier 234 about the second axis 222, but each of the second planet gears 242 can be coupled to the planet carrier 234 for rotation relative to the planet carrier and relative to the first planet gears 238 about a rotational axis of the respective second planet gear 242. Each of the second planet gears 242 can be disposed generally radially between the first planet gears 238 and the sun gear 230 and can be meshingly engaged with the internal gear 226. Each of the second planet gears 242 can be meshingly engaged with a corresponding one of the first planet gears 238. In the example provided, the second planet gears 242 can be equally spaced circumferentially about the second axis 222.

The first torque transfer device 126 can include any type of clutch or coupling device that can be employed to selectively transmit rotary power from the second output member 250 to the fourth half-shaft 146. In the example provided, the first torque transfer device 126 is a friction clutch, such as a wet clutch for example and can include a first plate carrier 262, a second plate carrier 264, a plurality of first friction plates 266, a plurality of second friction plates 268, a third output member 270, and a first actuator 272. The first plate carrier 262 can be disposed about the second axis 222 and fixedly coupled to the second output member 250 for common rotation therewith about the second axis 222. The second plate carrier 264 can be disposed about the second axis 222 and fixedly coupled to the third output member 270 for common rotation therewith about the second axis 222. The third output member 270 can be drivingly coupled to the fourth half-shaft 146 and can be fixedly coupled therewith for common rotation about the second axis 222.

In the example provided, the first plate carrier 262 is an outer plate carrier and the second plate carrier 264 is an inner carrier, such that the first plate carrier 262 is disposed radially about the second plate carrier 264. In an alternative construction, not specifically shown, the first plate carrier 262 can be an inner carrier and the second plate carrier 264 can be an outer carrier, such that the second plate carrier 264 is disposed radially about the first plate carrier 262.

The first friction plates 266 can be disposed about the second axis 222 and coupled to the first plate carrier 262 for common rotation therewith about the second axis 222, while being axially slidable relative to the first plate carrier 262. For example, the first friction plates 266 can have a plurality of splines (not shown) and the first plate carrier 262 can have a plurality of mating splines (not shown) that non-rotatably, but axially slidably engage the splines of the first friction plates 266.

The second friction plates 268 can be interleaved with the first friction plates 266. The second friction plates 268 can be disposed about the second axis 222 and coupled to the second plate carrier 264 for common rotation therewith about the second axis 222, while being axially slidable relative to the second plate carrier 264. For example, the second friction plates 268 can have a plurality of splines (not shown) and the second plate carrier 264 can have a plurality of mating splines (not shown) that non-rotatably, but axially slidably engage the splines of the second friction plates 268.

The first actuator 272 can be a linear motor configured to apply an axial engagement force through an engagement member 274 to the first and second friction plates 266, 268 to axially compress the first and second friction plates 266, 268 together to transfer rotary power between the first plate carrier 262 and the second plate carrier 264. In the example provided, the first actuator 272 can be a piston cylinder device including an annular piston within an annular cylinder and disposed about the second axis 222, though other types of linear actuators can be used. For example, the first actuator 272 could employ an electromagnetic solenoid, a motor driven screw, ball-ramp, cam, or another suitable type of linear motor.

The first actuator 272 can be in communication with the control module 150. The control module 150 can control the operation of the first actuator 272 to be operated in a first or disconnected mode, and a second or connected mode. In the disconnected mode, the engagement member 274 of the first actuator 272 does not compress the first and second friction plates 266, 268 together and rotary power is not transmitted between the first and second plate carriers 262, 264. In this disconnected mode, the fourth half-shaft 146 and corresponding one of the wheels 114 are disconnected from the second output member 250 of the second differential 130. As such, rotation of the fourth half-shaft 146 resulting from rolling motion of the corresponding wheel 114 does not "back-drive" the second differential 130, and rotation of the input gear 122 is not transmitted to the wheels 114.

In the connected mode, the engagement member 274 of the first actuator 272 compresses the first and second friction plates 266, 268 together to transmit rotary power between the first and second plate carriers 262, 264. Thus the first torque transfer device 126 can act as a disconnect mechanism for the rear axle assembly 110.

The second torque transfer device 134 can include any type of clutch or coupling device that can be employed to selectively transmit rotary power from the planet carrier 234 to the fourth half-shaft 146. In the example provided, the second torque transfer device 134 is a friction clutch, such as a wet clutch for example and can include a third plate carrier 280, a fourth plate carrier 282, a plurality of third friction plates 284, a plurality of fourth friction plates 286, and a second actuator 288. The third plate carrier 280 can be disposed about the second axis 222 and fixedly coupled to the second axial side 258 of the planet carrier 234 for common rotation therewith about the second axis 222. In the example provided, the third plate carrier 280 is fixedly coupled to the second axial side 258 of the planet carrier 234 by an intermediate member 290 disposed radially about the first torque transfer device 126, such that the first torque transfer device 126 is axially between the second differential 130 and the second torque transfer device 134.

The fourth plate carrier 282 can be disposed about the second axis 222 and fixedly coupled to the third output member 270 and the fourth half-shaft 146 for common rotation therewith about the second axis 222. In the example provided, the third plate carrier 280 is an outer plate carrier and the fourth plate carrier 282 is an inner carrier, such that the third plate carrier 280 is disposed radially about the fourth plate carrier 282.

The third friction plates 284 can be disposed about the second axis 222 and coupled to the third plate carrier 280 for common rotation therewith about the second axis 222, while being axially slidable relative to the third plate carrier 280. For example, the third friction plates 284 can have a plurality of splines (not shown) and the third plate carrier 280 can have a plurality of mating splines (not shown) that non-rotatably, but axially slidably engage the splines of the third friction plates 284.

The fourth friction plates 286 can be interleaved with the third friction plates 284. The fourth friction plates 286 can be disposed about the second axis 222 and coupled to the fourth plate carrier 282 for common rotation therewith about the second axis 222, while being axially slidable relative to the fourth plate carrier 282. For example, the fourth friction plates 286 can have a plurality of splines (not shown) and the fourth plate carrier 282 can have a plurality of mating splines (not shown) that non-rotatably, but axially slidably engage the splines of the fourth friction plates 286.

The second actuator 288 can be a linear motor configured to apply an axial engagement force through a second engagement member 276 to the third and fourth friction plates 284, 286 to axially compress the third and fourth friction plates 284, 286 together to transfer rotary power between the third plate carrier 280 and the fourth plate carrier 282. In the example provided, the second actuator 288 can be a piston cylinder device including an annular piston within an annular cylinder and disposed about the second axis 222, though other types of linear actuators can be used. For example, the second actuator 288 could employ an electromagnetic solenoid, a motor driven screw, ball-ramp, cam, or another suitable type of linear motor.

The second actuator 288 can be in communication with the control module 150. The control module 150 can control the operation of the second actuator 288 to be operated in a first or disconnected mode, and a second or connected mode. In the disconnected mode, the second engagement member 276 of the second actuator 288 does not compress the third and fourth friction plates 284, 286 together and rotary power is not transmitted between the third and fourth plate carriers 280, 282. In this disconnected mode, the fourth half-shaft 146 and corresponding one of the wheels 114 are disconnected from the planet carrier 234 of the second differential 130. As such, when the first torque transfer device 126 is operated in the connected mode while the second torque transfer device 134 is operated in the disconnected mode, the second differential 130 operates as an open differential to output torque differentiation to the third and fourth half-shafts 142, 146.

When the second actuator 288 is operated in the connected mode, the second engagement member 276 of the second actuator 288 compresses the third and fourth friction plates 284, 286 together to transmit rotary power between the third and fourth plate carriers 280, 282. As such, when the first torque transfer device 126 is operated in the connected mode while the second torque transfer device 134 is operated in the connected mode, the second torque transfer device 134 couples the planet carrier 234 to the second output member 250 for common rotation, thus inhibiting torque differentiation between the wheels 114. Since the second torque transfer device 134 is a friction clutch, the second torque transfer device 134 provides a "limited slip" operation or toque biasing operation to the second differential 130, wherein the minimum amount of "slip" depends on the maximum frictional holding power of the third and fourth friction plates 284, 286. In addition, the control module 150 can be configured to control the second actuator 288 to vary the amount of "slip" by controlling the engagement force applied to the third and fourth friction plates 284, 286.

Figure 3:
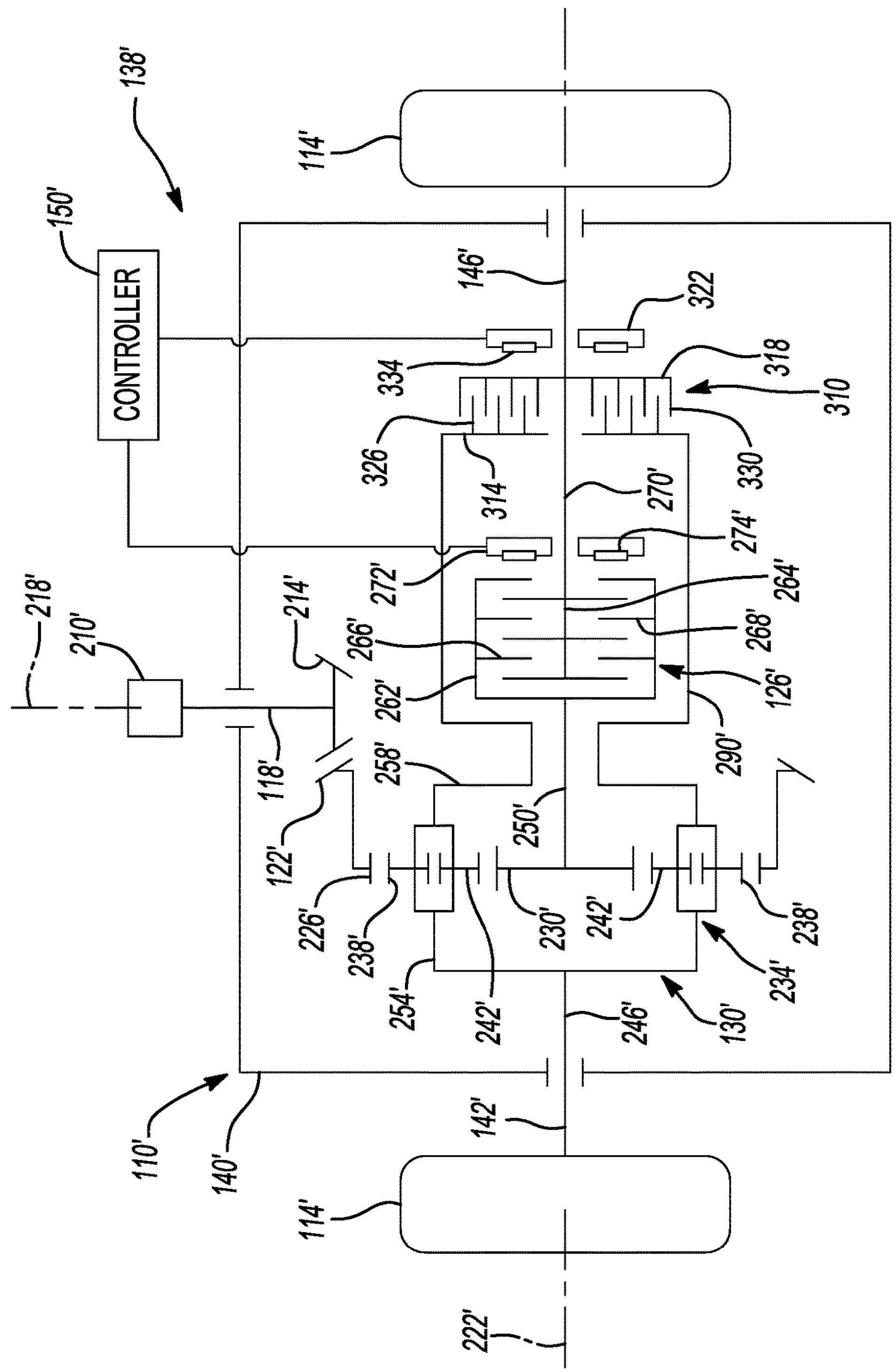
FIG. 3 is a schematic illustration, similar to FIG. 2, illustrating a rear drive module of a second configuration.

With additional reference to FIG. 3, a rear axle assembly 110' of a second construction is illustrated. The rear axle assembly 110' can be similar to the rear axle assembly 110 (FIGS. 1 and 2) described above, except as otherwise shown or described herein. Accordingly, elements indicated with primed reference numerals are similar to those elements having similar, non-primed reference numerals, except as otherwise shown or described herein. In particular, the rear axle assembly 110' includes a third torque transfer device 310 instead of the second torque transfer device 134 (FIG. 2).

The third torque transfer device 310 can be disposed within the housing 140'. The third torque transfer device 310 can include any type of clutch or coupling device that can be employed to selectively and positively transmit rotary power from the planet carrier 234' to the fourth half-shaft 146'. In the example provided, the third torque transfer device 310 is a dog clutch including a first dog member 314, a second dog member 318, and a third actuator 322. The first dog member 314 can be disposed about the second axis 222 and fixedly coupled to the second axial side 258' of the planet carrier 234' for common rotation therewith about the second axis 222. In the example provided, the first dog member 314 is fixedly coupled to the second axial side 258' of the planet carrier 234' by the intermediate member 290' disposed radially about the first torque transfer device 126', such that the first torque transfer device 126 is axially between the second differential 130' and third torque transfer device 310. The first dog member 314 can have a plurality of first dog teeth 326 disposed about the second axis 222.

The second dog member 318 can be disposed about the second axis 222' and coupled to the third output member 270' and the fourth half-shaft 146' for common rotation therewith about the second axis 222'. In the example provided, the second dog member 318 is axially slidable along the second axis 222' relative to the third output member 270' and the fourth half-shaft 146', such as by way of a splined connection for example. The second dog member 318 can be axially slidable between a first or disconnected position and a second or connected position. The second dog member 318 can have a plurality of second dog teeth 330 disposed about the second axis 222' that can meshingly engage with the first dog teeth 326 of the first dog member 314 to couple the first and second dog members 314, 318 for common rotation when the second dog member 318 is in the connected position. When the second dog member 318 is in the disconnected position, the first and second dog teeth 326, 330 can be disengaged from each other to permit relative rotation between the first and second dog members 314, 318. In the example provided the first and second dog teeth 326, 330 extend axially toward each other. In an alternative construction, the first dog teeth 326 can be internal splines, while the second dog teeth 330 can be external splines that mate with the first dog teeth 326.

The third actuator 322 can be a linear motor configured to apply an axial engagement force through a third engagement member 334 to the second dog member 318 to axially translate the second dog member 318 and selectively engage or disengage the second dog member 318 with the first dog member 314 to transmit rotary power therebetween. In the example provided, the third actuator 322 can be a piston cylinder device including an annular piston within an annular cylinder and disposed about the second axis 222', though other types of linear actuators can be used. For example, the third actuator 322 could employ an electromagnetic solenoid, a motor driven screw, ballramp, cam, or another suitable type of linear motor.

The third actuator 322 can be in communication with the control module 150'. The control module 150' can control the operation of the third actuator 322 to be operated in a first or disconnected mode, and a second or connected mode. In the disconnected mode, the third actuator 322, via the third engagement member 334, positions the second dog member 318 in the disconnected position such that rotary power is not transmitted between the first and second dog members 314, 318. In this disconnected mode, the fourth half-shaft 146' and corresponding one of the wheels 114' are disconnected from the planet carrier 234' of the second differential 130'. As such, when the first torque transfer device 126' is operated in the connected mode while the third torque transfer device 310 is operated in the disconnected mode, the second differential 130' operates as an open differential to output torque differentiation to the third and fourth half-shafts 142', 146'.

When the third actuator 322 is operated in the connected mode, the third actuator 322 positions the second dog member 318, via the third engagement member 334, in the connected position to transmit rotary power between the first and second dog members 314, 318. As such, when the first torque transfer device 126' is operated in the connected mode while the third torque transfer device 310 is operated in the connected mode, the third torque transfer device 310 couples the planet carrier 234' to the second output member 250' for common rotation, thus preventing torque differentiation between the wheels 114'. Since the third torque transfer device 310 is a positive engagement clutch (i.e., positive engagement of the first and second dog teeth 326, 330), the third torque transfer device 310 provides a "locking" operation to the second differential 130' such that equal torque can be selectively output from the second differential 130' to each of the wheels 114'.

Figure 4:
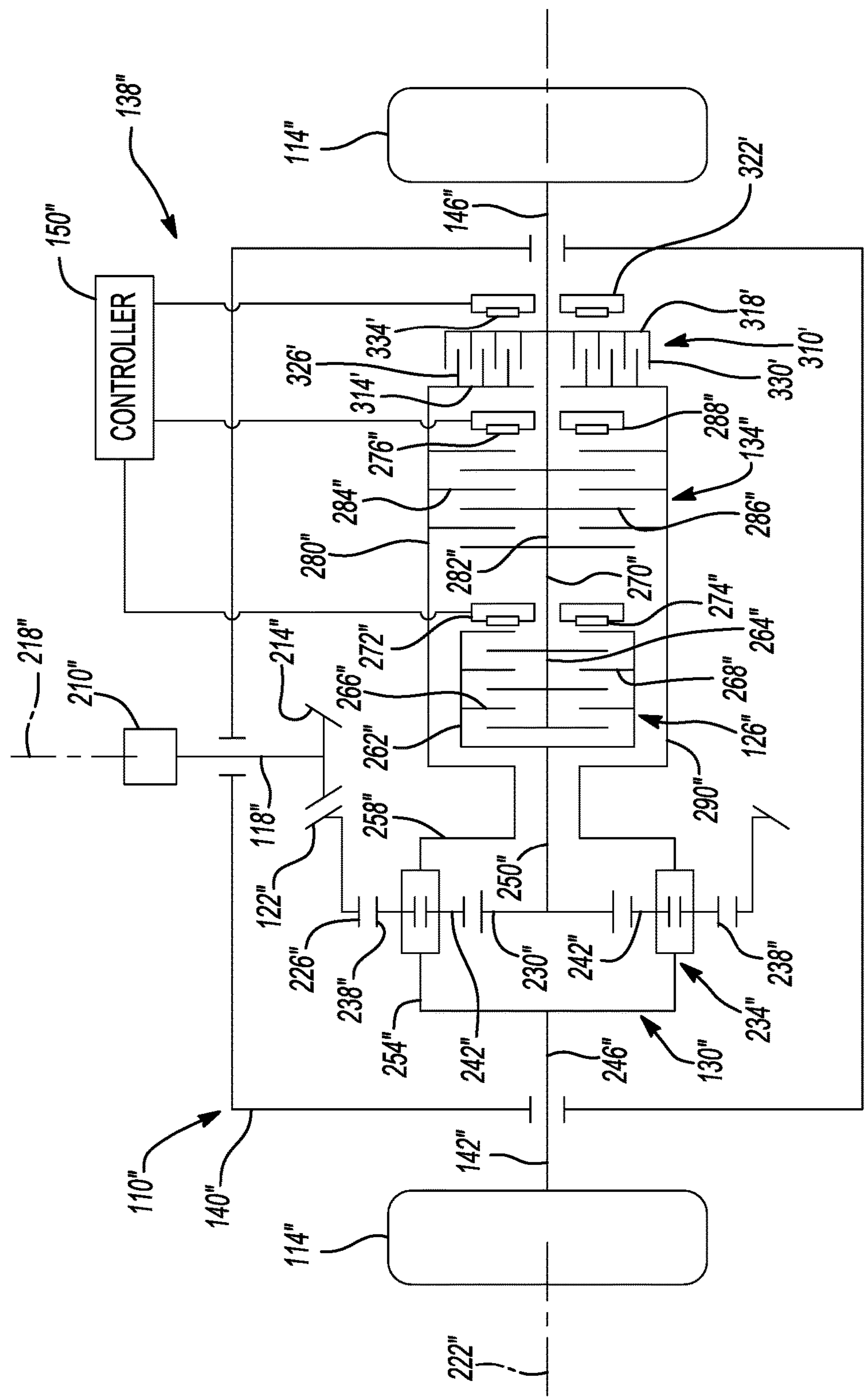
FIG. 4 is a schematic illustration, similar to FIG. 2, illustrating a rear drive module of a third configuration.

With additional reference to FIG. 4, a rear axle assembly 110" of a third construction is illustrated. The rear axle assembly 110" can be similar to the rear axle assembly 110 (FIGS. 1 and 2) and 110' (FIG. 3) described above, except as otherwise shown or described herein. Accordingly, elements indicated with primed reference numerals or double primed reference numerals are similar to those elements having similar, non-primed reference numerals, except as otherwise shown or described herein.

In particular, the rear axle assembly 110" includes the second torque transfer device 134" and the third torque transfer device 310'. In the example provided, the third plate carrier 280" can be fixedly coupled to the first dog member 314' for common rotation about the second axis 222". In the example provided, the second torque transfer device 134" is axially between the first torque transfer device 126" and the third torque transfer device 310', though other configurations can be used.

Thus, the rear axle assembly 110" can be operated in a disconnected mode and a plurality of connected modes. In the disconnected mode (i.e., the first torque transfer device 126" is in the disconnected mode), torque is not transmitted from the second differential 130" to the wheels 114" and the wheels 114" do not back-drive the input pinion 118". In an "open differential" mode of the rear axle assembly 110", the first torque transfer device 126" is operated in its connected mode, while the second and third torque transfer devices 134", 310' are operated in their respective disconnected modes. In a "limited slip differential" mode of the rear axle assembly 110", the first torque transfer device 126" is operated in its connected mode, while the third torque transfer device 310' is operated in its disconnected mode, and the second torque transfer device 134" is operated in its connected mode or a torque biasing mode. In a "locked differential" mode of the rear axle assembly 110", the first torque transfer device 126" is operated in its connected mode, while the third torque transfer device 134" is operated in its connected mode. In the locked differential mode of the rear axle assembly 110", the second torque transfer device 134" may be either in its connected mode, or its disconnected mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An all-wheel drive vehicle drivetrain comprising:

an input member;

a first output shaft and a second output shaft;

a planetary differential including:

an internal gear disposed about a central axis and drivingly coupled to the input member to receive input torque from the input member;

a planet carrier coupled to the first output for common rotation about the central axis, the planet carrier being rotatable relative to the internal gear;

a sun gear rotatable about the central axis relative to the internal gear and the planet carrier; and a differential gear set supported by the planet carrier and configured to receive input torque from the internal gear and to output differential torque to the planet carrier and the sun gear;

a first clutch operable in a first mode wherein the sun gear is rotatable relative to the second output shaft, and a second mode, wherein the sun gear is drivingly coupled to the second output shaft for common rotation about the central axis when the first clutch is operated in the second mode; and a second clutch operable in a third mode wherein the second clutch does not transmit torque between the planet carrier and the second output shaft, and a fourth mode wherein the second clutch transmits torque between the planet carrier and the second output shaft;

wherein the input member is rotatable about a second axis that is transverse to the central axis.

2. The all-wheel drive vehicle drivetrain of claim 1, further comprising a housing, wherein the planetary differential, the first clutch, and the second clutch are disposed within the housing.

3. The all-wheel drive vehicle drivetrain of claim 2, wherein the first output extends through a first side of the housing and the second output extends through a second side of the housing that is opposite the first side.

4. The all-wheel drive vehicle drivetrain of claim 1, further comprising a bevel ring gear fixedly coupled to the internal gear for common rotation about the central axis, wherein the input member includes an input pinion gear meshingly engaged with the bevel ring gear.

5. The all-wheel drive vehicle drivetrain of claim 1, wherein the first clutch includes a plurality of first friction plates, a plurality of second friction plates, a first plate carrier, a second plate carrier, and an actuator, the first plate carrier being coupled to the sun gear for common rotation, the second plate carrier being coupled to the second output shaft for common rotation, the first friction plates being coupled to the first plate carrier for common rotation while being axially translatable relative to the first plate carrier, the second friction plates being interleaved with the first friction plates and being coupled to the second plate carrier for common rotation while being axially translatable relative to the second plate carrier, the actuator being configured to selectively compress the first and second friction plates to transmit torque between the first and second friction plates.

6. The all-wheel drive vehicle drivetrain of claim 1, wherein the second clutch includes a plurality of first friction plates, a plurality of second friction plates, a first plate carrier, a second plate carrier, and an actuator, the first plate carrier being coupled to the planet carrier for common rotation, the second plate carrier being coupled to the second output shaft for common rotation, the first friction plates being coupled to the first plate carrier for common rotation while being axially translatable relative to the first plate carrier, the second friction plates being interleaved with the first friction plates and being coupled to the second plate carrier for common rotation while being axially translatable relative to the second plate carrier, the actuator being configured to selectively compress the first and second friction plates to transmit torque between the first and second friction plates.

7. The all-wheel drive vehicle drivetrain of claim 6, wherein the actuator is configured to selectively provide a variable amount of engagement force to the first and second friction plates to operate the second clutch in a limited slip mode.

8. The all-wheel drive vehicle drivetrain of claim 6, further comprising a third clutch including a first dog member, a second dog member, and a second actuator, the first dog member being coupled to the planet carrier for common rotation, the second dog member being coupled to the second output shaft for common rotation, the second actuator being configured to move one of the first dog member or the second dog member into meshing engagement with the other of the first dog member or the second dog member to transmit torque between the first and second dog members.

9. The all-wheel drive vehicle drivetrain of claim 1, wherein the second clutch includes a first dog member, a second dog member, and a second actuator, the first dog member being coupled to the planet carrier for common rotation, the second dog member being coupled to the second output shaft for common rotation, the second actuator being configured to move one of the first dog member or the second dog member into meshing engagement with the other of the first dog member or the second dog member to transmit torque between the first and second dog members.

10. The all-wheel drive vehicle drivetrain of claim 1, wherein the differential gear set includes a plurality of first planet gears and a plurality of second planet gears, each first planet gear being supported by the planet carrier for common rotation about the central axis with the planet carrier and for rotation relative to the planet carrier about a respective rotary axis of each first planet gear, each first planet gear being meshingly engaged with the internal gear and a respective one of the second planet gears, each second planet gear being supported by the planet carrier for common rotation about the central axis with the planet carrier and for rotation relative to the planet carrier about a respective rotary axis of each second planet gear, each second planet gear being meshingly engaged with the sun gear.

11. An all-wheel drive vehicle drivetrain comprising:

a housing;

an input member supported within the housing for rotation about a first axis;

a first output shaft and a second output shaft supported within the housing for rotation about a second axis that is transverse to the first axis;

a planetary differential disposed within the housing and including:

an internal gear rotatable about the second axis and drivingly coupled to the input member to receive input torque from the input member;

a planet carrier coupled to the first output for common rotation about the second axis, the planet carrier being rotatable relative to the internal gear;

a sun gear rotatable about the second axis relative to the internal gear and the planet carrier; and a differential gear set supported by the planet carrier and configured to receive input torque from the internal gear and to output differential torque to the planet carrier and the sun gear;

a first clutch operable to selectively couple and decouple the sun gear for common rotation with the second output shaft; and a second clutch operable to selectively couple and decouple the planet carrier with the second output shaft.

12. The all-wheel drive vehicle drivetrain of claim 11, wherein the first output extends through a first side of the housing, the second output extends through a second side of the housing that is opposite the first side, and the input member extends through a third side of the housing.

13. The all-wheel drive vehicle drivetrain of claim 11, further comprising a bevel ring gear fixedly coupled to the internal gear for common rotation about the second axis, wherein the input member includes an input pinion gear meshingly engaged with the bevel ring gear.

14. The all-wheel drive vehicle drivetrain of claim 11, wherein the first clutch includes a plurality of first friction plates, a plurality of second friction plates, a first plate carrier, a second plate carrier, and an actuator, the first plate carrier being coupled to the sun gear for common rotation, the second plate carrier being coupled to the second output shaft for common rotation, the first friction plates being coupled to the first plate carrier for common rotation while being axially translatable relative to the first plate carrier, the second friction plates being interleaved with the first friction plates and being coupled to the second plate carrier for common rotation while being axially translatable relative to the second plate carrier, the actuator being configured to selectively compress the first and second friction plates to transmit torque between the first and second friction plates.

15. The all-wheel drive vehicle drivetrain of claim 11, wherein the second clutch includes a plurality of first friction plates, a plurality of second friction plates, a first plate carrier, a second plate carrier, and an actuator, the first plate carrier being coupled to the planet carrier for common rotation, the second plate carrier being coupled to the second output shaft for common rotation, the first friction plates being coupled to the first plate carrier for common rotation while being axially translatable relative to the first plate carrier, the second friction plates being interleaved with the first friction plates and being coupled to the second plate carrier for common rotation while being axially translatable relative to the second plate carrier, the actuator being configured to selectively compress the first and second friction plates to transmit torque between the first and second friction plates.

16. The all-wheel drive vehicle drivetrain of claim 15, wherein the actuator is configured to selectively provide a variable amount of engagement force to the first and second friction plates to operate the second clutch in a limited slip mode.

17. The all-wheel drive vehicle drivetrain of claim 15, further comprising a third clutch including a first dog member, a second dog member, and a second actuator, the first dog member being coupled to the planet carrier for common rotation, the second dog member being coupled to the second output shaft for common rotation, the second actuator being configured to move one of the first dog member or the second dog member into meshing engagement with the other of the first dog member or the second dog member to transmit torque between the first and second dog members.

18. The all-wheel drive vehicle drivetrain of claim 11 wherein the second clutch includes a first dog member, a second dog member, and a second actuator, the first dog member being coupled to the planet carrier for common rotation, the second dog member being coupled to the second output shaft for common rotation, the second actuator being configured to move one of the first dog member or the second dog member into meshing engagement with the other of the first dog member or the second dog member to transmit torque between the first and second dog members.

19. The all-wheel drive vehicle drivetrain of claim 11, wherein the differential gear set includes a plurality of first planet gears and a plurality of second planet gears, each first planet gear being supported by the planet carrier for common rotation about the second axis with the planet carrier and for rotation relative to the planet carrier about a respective rotary axis of each first planet gear, each first planet gear being meshingly engaged with the internal gear and a respective one of the second planet gears, each second planet gear being supported by the planet carrier for common rotation about the second axis with the planet carrier and for rotation relative to the planet carrier about a respective rotary axis of each second planet gear, each second planet gear being meshingly engaged with the sun gear.

* * * * *